(12) United States Patent
Arimura

(10) Patent No.: US 8,305,217 B2
(45) Date of Patent: Nov. 6, 2012

(54) FIELD IMPROVING SYSTEM PROVIDED WITH RESONATOR

(75) Inventor: Kunitaka Arimura, Kawasaki (JP)

(73) Assignee: Smart Co., Ltd., Kanagawa (JP)

( * ) Notice: Subject to any disclaimer, the term of this patent is extended or adjusted under 35 U.S.C. 154(b) by 606 days.

(21) Appl. No.: 12/312,623

(22) PCT Filed: Nov. 21, 2007

(86) PCT No.: PCT/JP2007/072544
§ 371 (c)(1),
(2), (4) Date: May 19, 2009

(87) PCT Pub. No.: WO2008/062828
PCT Pub. Date: May 29, 2008

(65) Prior Publication Data
US 2009/0315680 A1    Dec. 24, 2009

(30) Foreign Application Priority Data

Nov. 21, 2006  (JP) .................................. 2006-314155

(51) Int. Cl.
*G08B 13/14* (2006.01)

(52) U.S. Cl. .................................. 340/572.5; 340/10.51

(58) Field of Classification Search ............... 340/572.1, 340/572.5, 10.1, 10.51
See application file for complete search history.

(56) References Cited

U.S. PATENT DOCUMENTS 6,362,738 B1 *  3/2002  Vega ......................... 340/572.1

FOREIGN PATENT DOCUMENTS

| JP | 10/49639 | 2/1998 |
|----|----------|--------|
| JP | 10/215210 | 8/1998 |
| JP | 11/180079 | 7/1999 |
| JP | 2000/50534 | 2/2000 |
| JP | 2000/99655 | 4/2000 |
| JP | 2000/270501 | 9/2000 |
| JP | 2001/101370 | 4/2001 |
| JP | 2004/253858 | 9/2004 |
| JP | 2004/336605 | 11/2004 |
| JP | 2004/348497 | 12/2004 |
| JP | U3121577 | 4/2006 |

* cited by examiner

*Primary Examiner* — Thomas Mullen
(74) *Attorney, Agent, or Firm* — James Creighton Wray

(57) ABSTRACT

The invention provides a system for improving communication statuses among a sensor, a tag and a non-contact type IC card for RFID (Radio Frequency Identification). In the present system, a resonator is added to a sensor a tag, or non-contact type IC card. The resonator is constituted by a coil and a capacitor. Further a magnetic substance is attached to the coil of the resonator so as to intensify the magnetic field.

10 Claims, 15 Drawing Sheets

(a)

(b)

(a)

(b)

(a)

(b)

(a)

(b)

(a)

(b)

(a)

(b)

FIELD IMPROVING SYSTEM PROVIDED WITH RESONATOR

This application claims the benefit of Japanese Application No. 2006-314155 filed Nov. 21, 2006 and PCT/JP2007/072544 filed Nov. 21, 2007, which are hereby incorporated by reference in their entirety.

FIELD OF THE INVENTION

The present invention relates to a field improving system provided with resonator for improving communication statuses between sensors and tags in RFID (Radio Frequency Identification) systems and non-contact type IC card systems, and also relates to a simple and effective field improving method.

RELATED BACKGROUND ART

In conventional system (for example see reference 1), sensors or tags communicate with non-contact type IC cards in a magnetic field or electric field actuated by electric currents flowing in successive tiny loop antennas formed by coils.

In the conventional system, however, sometimes sensitivity is deteriorated due to a deviation of resonating frequency influenced by a dielectric substance, a magnetic substance or a metal around the system. In some cases when a load to the system is high, loaded Q is decreased, so that sensitivity is deteriorated. Usually communication status is aggravated, when magnetic field or electric field around the system is deteriorated due to an inversed current, a stoppage of magnetic path or a distortion of the magnetic field caused by metal around the system. The magnetic substance can maintain the magnetic path to some extent, but not sufficiently. Sometimes resonating frequency is deviated to a large extent due to interactions among loop antennas. Usually in such cases resonating frequencies shift toward a lower frequency side.

Cited reference 1: Japanese utility model registered No. 3121577

DISCLOSURE OF THE INVENTION

Problems to be Solved by the Invention

If the magnetic field or electric field around the system can be intensified when the loaded Q is decreased or when the magnetic field is turbulent or weakened, the intensified magnetic field or the electric field leads the system to an easier communication status and increases a communicable range much longer. Sometimes such field intensification has great improving effects on the sensor or tag employing metal backed magnetic substance, so that it is useful to improve sensitivity of the sensor or tag and a communication status.

The present invention is carried out in view of the above-mentioned problems in order to provide the field improving system provided with a resonator, which improves the communication status between the sensor or tag and the non-contact type IC card.

Means to Solve the Problem

In order to solve the problems mentioned above, the field improving system provided with the resonator by the present invention is constituted as one of the following arrangements from (1) to (15).

(1) A field improving system comprising a sensor, IC tag or non-contact type IC card for RFID, wherein: one or more resonators are added to the field improving system.
(2) The field improving system according to (1), wherein: the resonator or resonators are directly attached to the sensor, IC tag or non-contact type IC card for improving the sensor, IC tag or non-contact type IC card.
(3) The field improving system according to (1) wherein: the resonator is constituted by a coil and a capacitor.
(4) The field improving system according to one of (1) to (3), wherein: a magnetic substance is attached to the coil of the resonator.
(5) The field improving system according to (1), wherein: the resonator is constituted by a distribution capacity such as a wire or a plate with a half wave or one wave and by an inductance.
(6) The field improving system according to one of (1) to (5), wherein: the resonator is formed in a disk-, oval-, polygon- or rod-shape.
(7) The field improving system according to (1), wherein: an antenna and the coil of the resonator are printed, etched or deposited on a plastic film.
(8) The field improving system according to (1), wherein: the resonator is sealed in plastic film or in a plastic package or a ceramic package.
(9) The field improving system according to (1), wherein: the capacitor of the resonator is constituted by thin metal sheet electrodes and a plastic film inserted in-between.
(10) The field improving system according to (1), wherein: glue is adhered to one face of a plastic which supports the resonator and the glued face is covered with silicone paper.
(11) The field improving system according to (1), wherein: the resonating frequency is selected as an operating frequency; the resonating frequency is adjusted a little bit higher than the operating frequency, when the resonating frequency is shifted to a lower side; or the resonating frequency is adjusted a little bit lower than the operating frequency, when the resonating frequency is shifted to a higher side.
(12) The field improving system according to (1), wherein: a magnetic substance, a dielectric substance or a metal foil is attached to the resonator.
(13) The field improving system according to (1), wherein: a plurality of resonators having appropriate shapes are arranged near the sensor or tag, or some of the resonators are stuck to the sensor or tag.
(14) The field improving system according to one of (1), (2), (3), (5) and (11), wherein: a magnetic substance is employed when the system is backed by a metal plate and a center axis of said coil is aligned parallel to the metal plate.
(15) The field improving system according to one of (1) to (14), wherein: the system is attached to a computer for controlling the system and administering memories.

Effects Attained by the Invention

When the resonator by the present invention is added to the sensor, the RFID tag or the non-contact type IC card or when the resonator by the present invention is arranged in among them, communication statuses among them are remarkably improved. The present invention also can be effectively applied to metal backed sensors or tags by arranging the resonators among the sensors, the tags and the non-contact type IC cards communication statuses among them are improved.

BRIEF DESCRIPTIONS OF THE DRAWINGS

REFERENCE CHARACTER LIST

Figure 1:
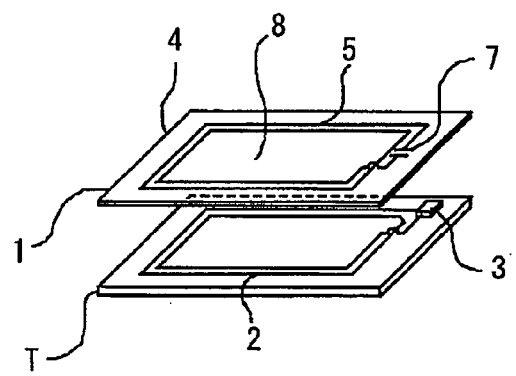
FIG. 1 is a schematic perspective view of a tag provided with a resonator by the present invention.

1 Substrate of a tag
1' Substrate
2 Coil
2' Sensor coil
3 IC
4 Plastic sheet on which a resonator is mounted
5 Coil (for resonator)
5' Induction coil
6 Magnetic substance
7, 7' Capacitor
8 Resonator or Resonating circuit
9 Glue
10 Paper to which silicone resin is applied
15 Coil (wound around a magnetic substance)
17 Capacitor
22, 22' Terminals (for a sensor coil)
C Non-contact type IC card
CB Control circuit
$H_1$, $H_2$ Magnetic field
MS Metal surface or Metal plate
P Plastic cover
PCB Printed circuit board
RC Resonator
R/W Reader/Writer
T, $T_1$, $T_2$ Tag

PREFERRED EMBODIMENTS BY THE PRESENT INVENTION

Hereinafter, the preferred embodiments by the present invention are explained in details.

EMBODIMENT

The present invention relates to a method to enhance a communication sensitivity in the sensor system or the tag system by adding a function for enhancing the intensity of magnetic field or electric field in order to extend a communicable range; by intensifying magnetic field components in a communicating direction; by attaching or approximating the resonator to the sensor or the tag.

Hereinafter embodiments are explained as referring to drawings.

FIG. 1 is the schematic perspective view of the tag provided with the resonator. A coil 2 is arranged in a substrate 1 of a tag T and an IC 3 is connected to the both ends of the coil 2.

A coil 5 is formed on a plastic film 4 of a resonator 8 attached or approximated to the tag, so that a resonating circuit comprising coil and capacitance is formed.

Since loaded electric charge is not lost in the resonator, high Q is kept in the resonator. And since an originally deviated or offset resonating frequency of the tag T can be tuned to a desired resonating frequency, a sensitivity of the tag T can be enhanced. In FIG. 1, the tag T and the resonator are arranged apart each other for explanation purposes, but both can be stuck together. The sensitivity of the tag is enhanced by an intensified magnetic field, when an electric current flows in the resonator.

Figure 2:
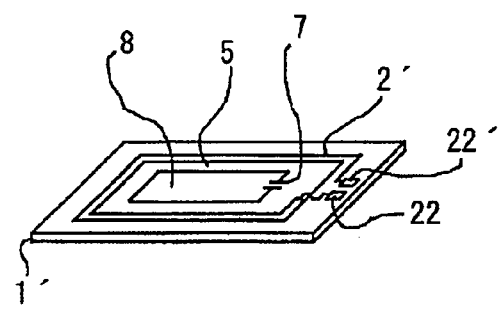
FIG. 2 is a schematic perspective view of a sensor coil provided with the resonator.

FIG. 2 is the schematic perspective view of the sensor coil to which the resonator is applied.

In the same manner as the tag, the resonator 8 is arranged in the vicinity of or stuck to the sensor coil 2'. The sensor coil 2' is formed on a substrate 1'. The resonator 8 is arranged in the center of the sensor coil 2'. However, when the coil 5 of the resonator 8 is too near to the sensor coil 2', the two coils interact with each other so that resonator cannot resonate with the sensor coil. Even if the interaction, namely, mutual inductance between the two coils is high, resonator can be adjusted so as to obtain a maximum intensity of the magnetic field.

Reference characters 22, 22' are terminals for exciting the sensor coil 2'.

Figure 3:
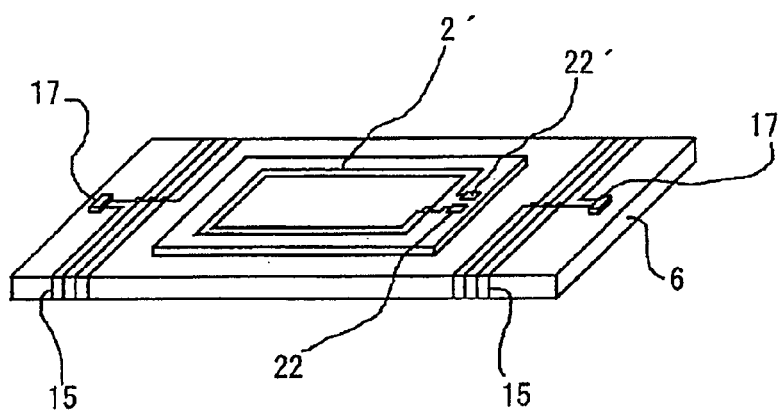
FIG. 3 is a schematic perspective view illustrating a system comprising a magnetic substance with the resonator and the sensor coil thereon.

FIG. 3 is the schematic perspective view of the system comprising the magnetic substance with the resonator and the sensor coil thereon. When magnetic field excited by the sensor coil 2' passes along a magnetic path of a magnetic substance 6, intensive magnetic field components are generated in the center and sides of the system by resonating circuits comprising coils 15 and capacitors 17 arranged at both ends of the magnetic path. Since intensive magnetic field components are generated by electric currents flowing in the resonating circuits wound around the magnetic substance 6, the magnetic field components in the sensor coil 2' are enhanced more, so that intensive vertical magnetic field components are obtained along a center axis of the sensor coil 2'. In the present example the resonating circuit is formed such that coils are wound around the magnetic substance and appropriate capacitors are attached thereto. However, the resonating circuit can be buried in the magnetic substance, so that a resonator is formed on the whole.

In this system, since magnetic field components pass in the sides of the magnetic substance, it is more effective to arrange metal surface below the magnetic substance without having bad effects from the metal surface. When the magnetic substance is directly arranged on the metal surface, sensitivity of the system is enhanced more by an imaging effect of the coils 15 wound around the substance 6. Metal backed sensors or tags, in which magnetic substances are employed, will be explained in examples illustrated in FIGS. 5, 9, 10, 11 and so on.

Figure 4:
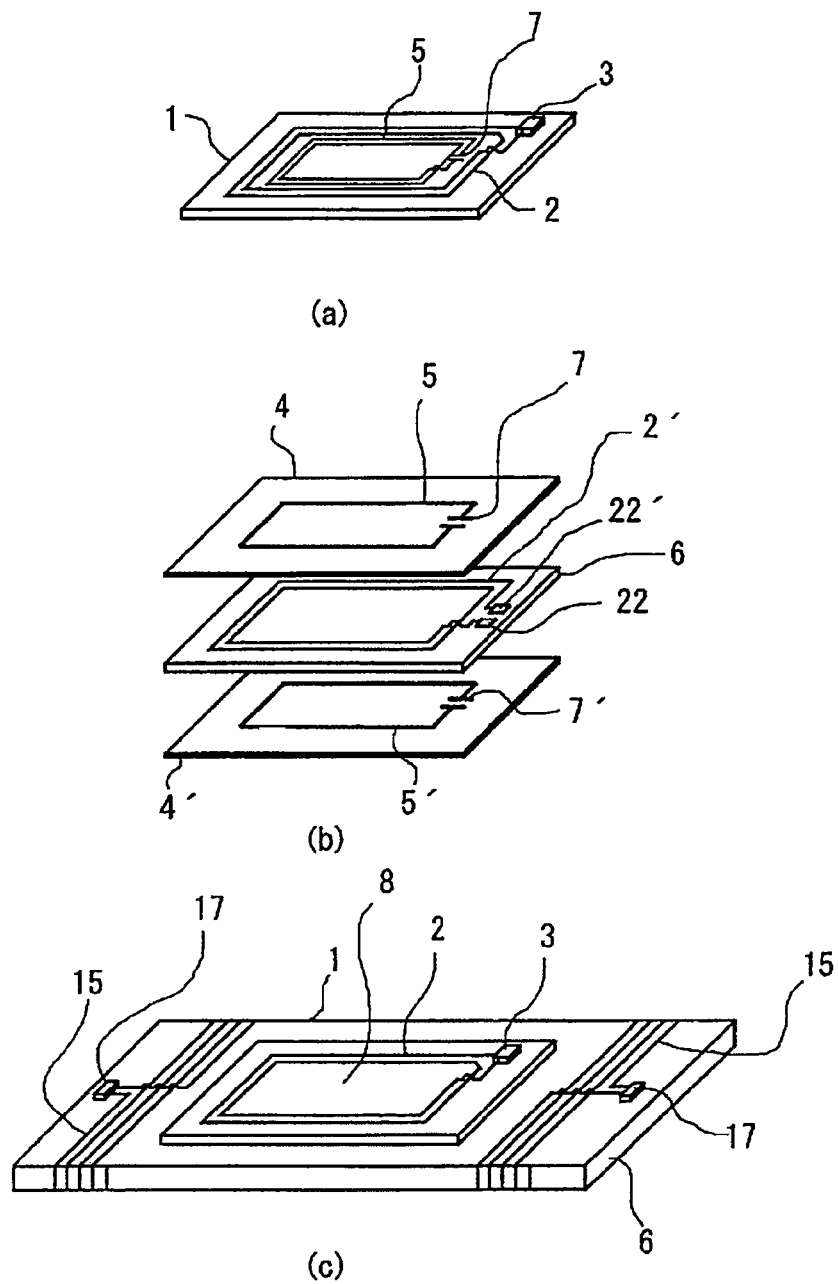
FIG. 4 is schematic perspective views illustrating applied examples of the resonator.

FIG. 4 depicts schematic perspective views illustrating the applied examples of the resonator. In a system shown in FIG. 4 (a), a resonator constituted by the coil 5 and the capacitor 7 is arranged inner side of the coil 2 of the tag 1. The IC 3 is connected to both ends of the coil 2.

In a system shown in FIG. 4 (b), power is supplied to the sensor coil 2' from the terminals 22, 22'. The sensor coil 2' is directly mounted on the magnetic substance 6 or indirectly mounted via a plastic sheet or the like.

A plastic sheet 4 on which the resonator is constituted (by the coil 5 and the capacitor 7), is adhered to a sensor circuit constituted by the magnetic substance 6 and the sensor coil 2'. The resonator is directly adhered to the sensor circuit or indirectly via an insulator or a dielectric substance such as plastic sheet or the like.

The resonator is tuned to resonate as mounted on the top.

In exceptional cases, a plastic sheet 4', on which another resonator constituted by an induction coil 5' and a capacitor 7' is mounted, can be arranged below the sensor circuit in place of the backed metal. For example, when the system is used in a 13.56 MHz band, a resonating frequency of the upper resonator is adjusted to 14-14.2 MHz and a resonating frequency of the lower resonator is adjusted to 13-13.3 MHz.

Vertical magnetic field components can be excited by a quantitative resonator above the magnetic substance and an inductive resonator under the magnetic substance. In FIG. 4 (b) the respective resonators are illustrated apart from the sensor circuit constituted by the sensor coil 2' and the magnetic substance 6, but they can be adhered to the sensor circuit.

When the sensor coil 2' or the coil 5 is arranged very near to the magnetic substance 6, inductance of the coil is fluctuated in accordance with a distance between the coil and the magnetic substance, so that the coil should not be arranged very near to the magnetic substance. Alternatively, the coil should be firmly stuck to the magnetic substance in order to keep the coil inductance stable, which is important to stabilize the system.

In a system shown in FIG. 4 (c), which is similar to the system shown in FIG. 3, the tag is mounted on the magnetic substance 6 provided with the resonating circuits (constituted by the coils 15 and capacitors 17) for enhancing sensitivity of the system even when arranged on or near to the metal surface. The tag 1 is adhered to on the magnetic substance 6 and the resonating circuits (constituted by the coils 15 and the capacitors 17) are arranged on the both sides so as to pass or to excite magnetic field components.

Figure 5:
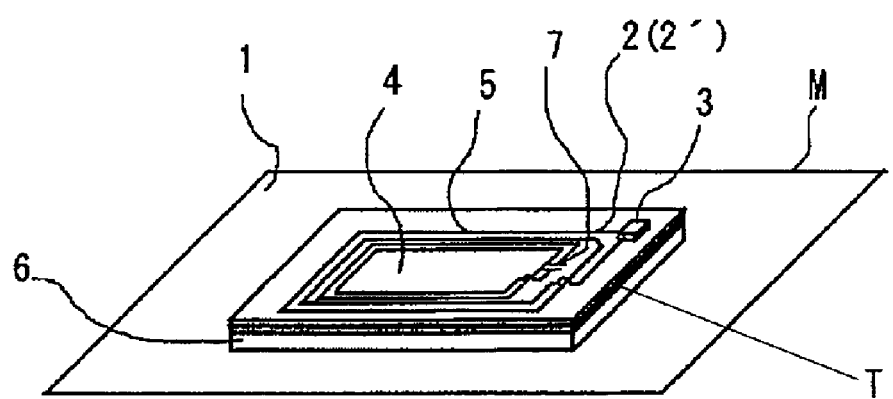
FIG. 5 is views illustrating a system comprising a metal backed conventional tag provided with the resonator.
Figure 5:
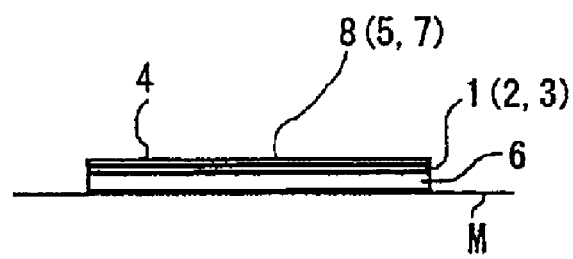

FIG. 5 depicts views illustrating the system comprising by the metal backed conventional tag provided with the resonator by the present invention. In this system, the plastic sheet 4, on which the resonator 8 constituted by the coil 5 and the capacitor 7 is mounted, is added to the conventional metal backed tag 1 constituted by the sheet formed magnetic substance 6, the coil 2 and the IC 3. Reference character M is the metal surface.

FIG. 5 (a) is a perspective view of the present system and FIG. 5 (b) is a side view of the system. As shown in FIG. 5 (b), the plastic sheet 4, on which the resonator 8 is mounted, is added on to the tag 1. Under the tag 1, the sheet formed magnetic substance 6 is adhered and usually backed by an aluminum foil in order to avoid large inductance fluctuations when mounted on the metal surface.

Figure 6:
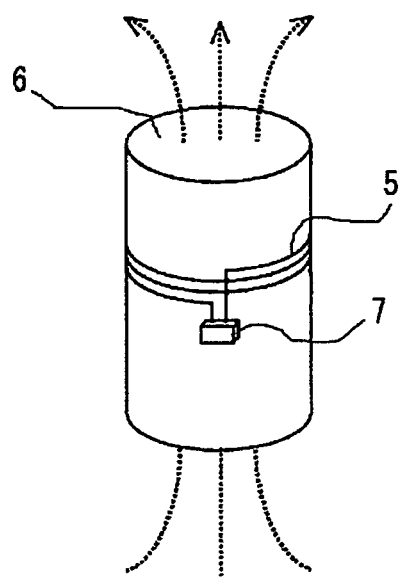
FIG. 6 is schematic perspective views illustrating resonators (resonating circuits) arranged around magnetic rods.
Figure 6:
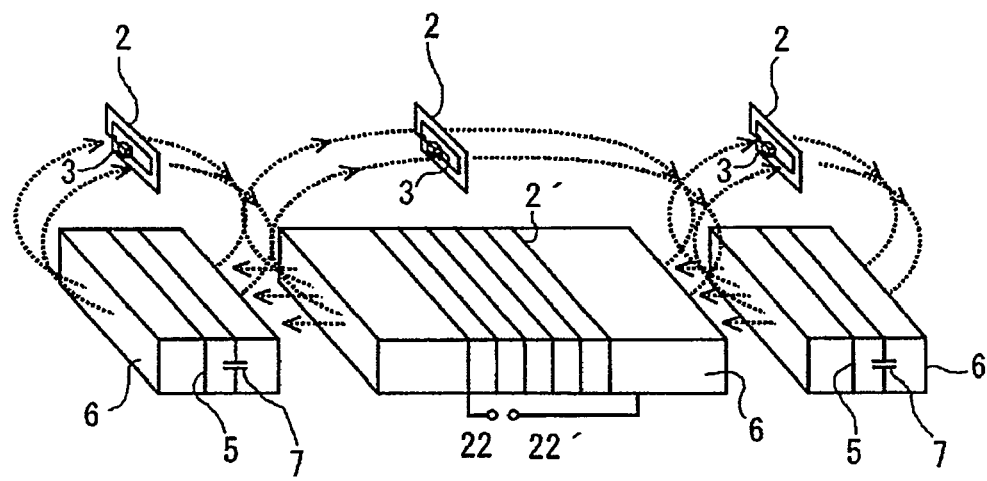

FIG. 6 depicts the schematic perspective views illustrating resonators (resonating circuits) arranged around magnetic rods. In FIG. 6 (a), a resonator is formed such that the coil 5 is wound around a circular rod (the magnetic substance 6) and the capacitor 7 is attached to both ends of the coil 5. This resonator enhances the magnetic field by the magnitudes of a relative permeability $\mu_r$ of the magnetic substance 6 and a resonating current when the resonator is placed in the magnetic field. When the relative permeability is high, a magnetic flux density can be effectively enhanced even by the magnetic substance 6 with a smaller diameter, so that a compact resonator can be realized.

A system illustrated in FIG. 6 (b) comprises three rectangular separated magnetic substances 6. The coils 5 and capacitors 7 are arranged in both ends of the magnetic substances 6, so that two resonators are constituted. And the sensor coil 2' is wound around the center magnetic substance 6. Information from a tag constituted by the coil 2 and the IC 3, which is arranged apart from the magnetic substances 6, is amplified by the resonators in order to interact with the magnetic field induced by the magnetic substances and the amplified information is transmitted to the sensor coil 2'. The present system comprises the three separated magnetic substances, but one monolithic magnetic substance can be employed instead.

Figure 7:
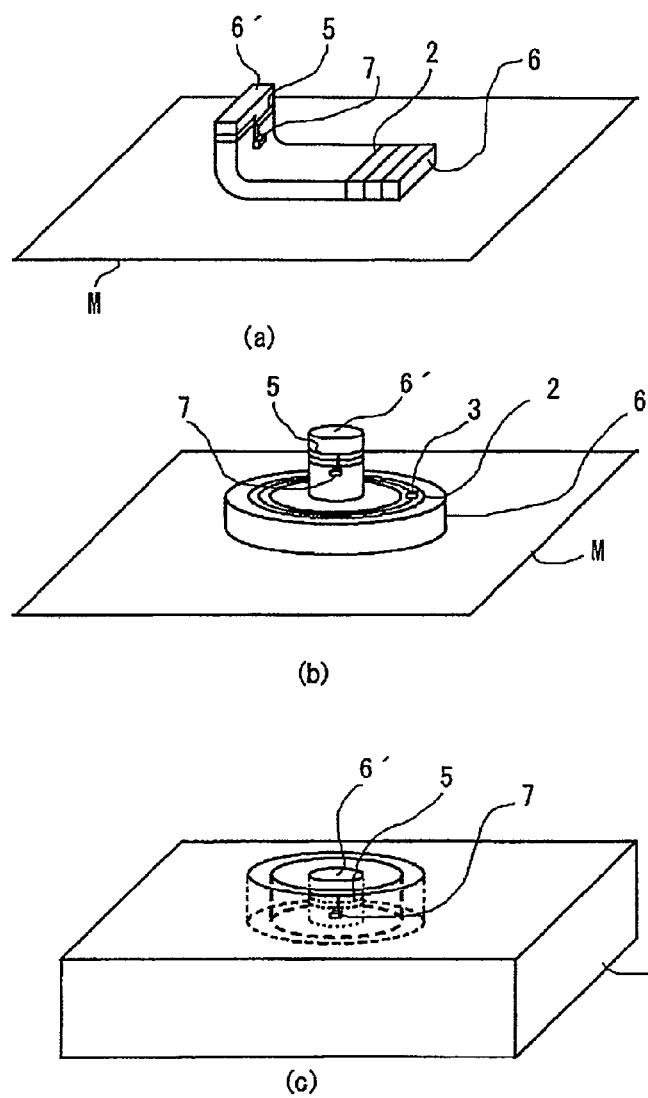
FIG. 7 is schematic perspective views illustrating applied examples of the resonator to metal backed sensor or tag.

FIG. 7 depicts schematic perspective views illustrating applied examples of the resonator to the metal backed sensor or tag. The sensor or tag is mounted on the metal surface M.

In FIG. 7 (a), the magnetic substance 6 is bent in its one end so that a vertical magnetic path 6' is formed so as to enhance vertical magnetic field components. The resonator constituted by the coil 5 and capacitor 7 is arranged in the vertical magnetic path 6'.

In FIG. 7 (b), the disk shaped magnetic substance 6 is employed. The magnetic substance has a vertical protruded rod 6' in its center, around which the resonator constituted by the coil 5 and the capacitor 7 is arranged.

In FIG. 7 (c), the magnetic substance is buried in the metal M. The magnetic substance has a coaxial vertical rod 6' in its center, around which the resonator constituted by the coil 5 and the capacitor 7 is arranged.

Figure 8:
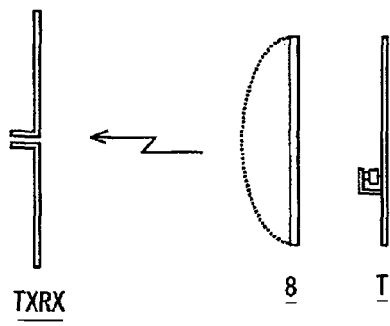
FIG. 8 is schematic view illustrating an applied example of the resonator to the sensor or tag for a high frequency range of UHF band.

FIG. 8 is a schematic view illustrating the applied example of the resonator to the sensor or tag for the high frequency range of UHF band. In the drawing, a transmitting/receiving antenna TXRX is arranged on the left side and the tag T is arranged on the right side. A resonator 8 having a resonating frequency of a half wave (one wave in the case of a loop antenna) determined by a distribution constant is arranged near to the tag T. Since the same principle applied to a wave guide or a reflector employed by the "Yagi-Uda" antenna, is employed in the present example, positioning and phase of the antenna should be taken into consideration.

Figure 9:
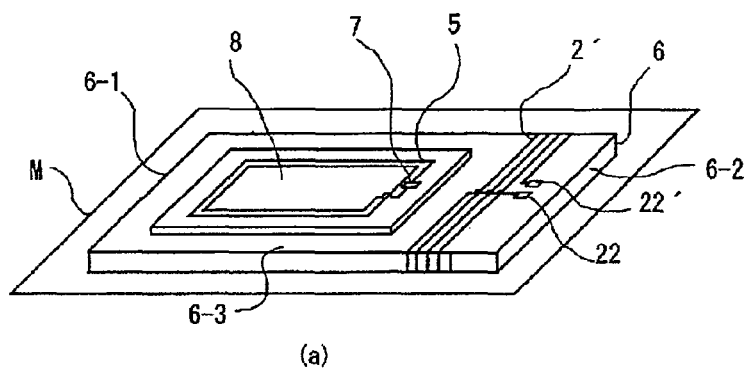
FIG. 9 is schematic perspective views illustrating systems comprising the resonator applied to the metal backed sensor.
Figure 9:
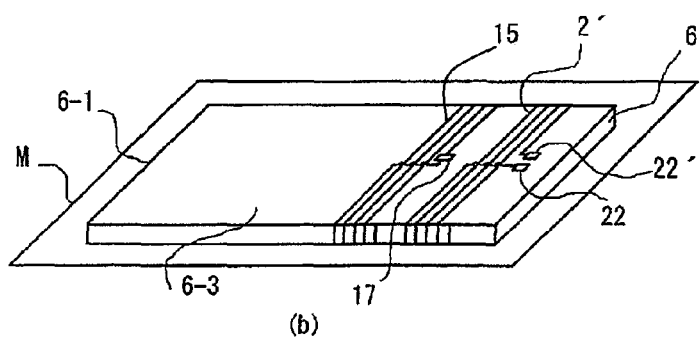

FIG. 9 depicts schematic perspective views illustrating systems comprising the resonator applied to the metal backed sensor. Since the magnetic substance 6 and the sensor coil 2' for exciting the magnetic field components are arranged parallel to the metal surface, a mirror image is generated by the metal surface under the metal surface so that the intensity of the magnetic field components is doubled.

Vertical magnetic filed components are easily generated in a wide area 6-3 on the left side of the magnetic substance 6 illustrated in FIG. 9 (a). The vertical magnetic field components are enhanced by the resonator 8 constituted by the coil 5 and the capacitor 7. In other words, magnetic field components being easily interacted with the tag or the non-contact type IC card are generated. The present system has a function of so called field formation. A lot of horizontal magnetic field components excited in one end 6-1 of the magnetic substance 6, are apt to lower the efficiency of the vertical magnetic field components. However, since the resonator excites only the vertical magnetic field components, the horizontal magnetic components are diminished, so that a sensitivity of the system is increased by 50% due to the enhanced vertical magnetic field components, which will be explained in detail as referring to FIG. 17 below. In FIG. 9 (b), the resonator constituted by the coil 15 and the capacitor 17, is directly mounted on the magnetic substance 6 so as to excite magnetic field components generated by sensor coil 2'.

When the two systems shown in FIGS. 9 (a) and (b) are combined, a performance of the combined system is raised a little bit compared with the system shown in FIG. 9 (a). Since the system shown in FIG. 9 (a) has the function of "field formation", this system can enhance the vertical magnetic field components more effectively than the system shown in FIG. 9 (b).

Figure 10:
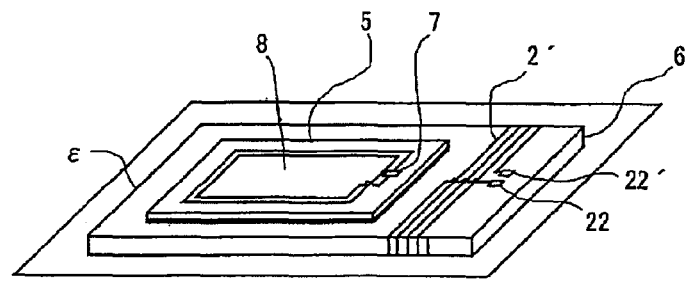
FIG. 10 is schematic perspective views illustrating systems comprising the resonator or resonating circuit applied to the metal backed sensor.
Figure 10:
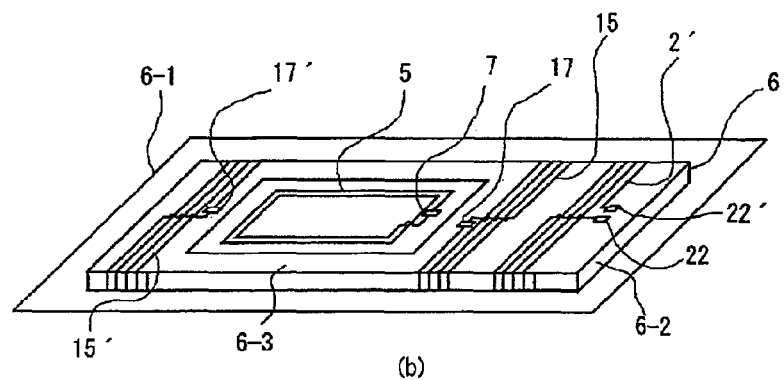

FIG. 10 is schematic perspective views illustrating systems comprising the resonators or the resonating circuits applied to the metal backed sensors.

The system shown in FIG. 10 (a) is constituted in the same way as in the system shown in FIG. 9 (a), but the resonator 8 constituted by the coil 5 and the capacitor 7, is not directly mounted on the magnetic substance 6. Difference is that resonator 8 is mounted on the magnetic substance via a thin dielectric substance .epsilon. or insulating substance such as paper, plastic sheet or the like.

Since when the coil 5 of the resonator is approximated very near to the magnetic substance 6, inductance of the coil fluctuate too much in accordance with a distance between the coil and the magnetic substance, so that it is hard to attain a stable resonance. Therefore the resonator is stabilized when the coil is arranged apart from the magnetic substance 6 a little bit by inserting the dielectric substance, which is suitable to control the resonating frequency by utilizing its permittivity. If it is not required to raise the permittivity so much, a substance having permittivity of nearly 1 can be employed.

The system shown in FIG. 10 (b) is a hybrid system based on combining the two systems shown in FIGS. 9 (a) and (b) to which a resonator (constituted by a coil 15' and a capacitor 17') is added to the left end portion 6-1 of the magnetic substance. The left-side resonator suppresses magnetic field component leakage from the left end of the magnetic substance by an inductive electric current flowing in the resonator.

When an induction electric current flows in the right-side resonator (constituted by the coil 15 and the capacitor 17) near to the sensor coil 2', magnetic field components passing through the coil are intensified. The right-side resonator has the similar function to the system shown in FIG. 4 (b) comprising the two resonators constituted by coil 5, the capacitor 7 and the coil 5' and the capacitor 7'.

The system shown in FIG. 10 (b) comprises the three resonators having different roles respectively. The coil 5 of the resonator arranged parallel to the surface of the magnetic substance 6, excites vertical magnetic field components and has a role of the field formation. The resonator (the coil 15, the coil 17) near to the sensor coil 2' acts electromagnetically. The left-side resonator (the coil 15', the capacitor 17') generates magnetic field components to compensate the magnetic field components passing through the coil 15'. It should be considered that when the magnetic field components generated by the left-side resonator are too intensive, vertical magnetic field components to be excited are also compensated.

Since power is supplied to the system from the right side via the sensor coil 2', the structure of the system is asymmetric. Consequently, the two resonators constituted by the coil 15, capacitor 17 and constituted by the coil 15', the capacitor 17' have different characteristics and functions respectively.

On the other hand, the two resonators shown in FIG. 3 have approximately similar characteristics and functions.

Also the two resonators (constituted by the coil 15, the capacitor 17) shown in FIG. 4 (c) have approximately similar characteristics and functions. Functions of the sensor and the tag are similar each other, a difference is that when the IC is arranged on a position corresponding to power supply terminals, it functions as a tag.

Figure 11:
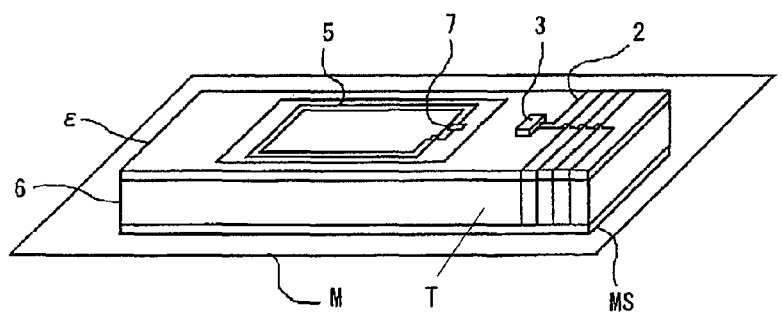
FIG. 11 is a schematic perspective view illustrating a system comprising the resonator applied to the metal backed magnetic tag.

FIG. 11 is the schematic perspective view illustrating the system comprising the resonator applied to metal backed magnetic tag.

The coil 2 is wound around the magnetic substance 6 and the IC 3 is connected to both ends of the coil 2. The coil 2 generates mainly horizontal magnetic field components along the magnetic substance. Since the coil 2 is arranged on one end of the magnetic substance, the coil also generates vertical magnetic field components in the center part of the magnetic substance 6. Further, the vertical magnetic field components are excited by the resonator (the coil 5, the capacitor 7) arranged in the center part. As explained in the system shown in FIG. 10 (a), the insulator stabilizes the fluctuation of the resonator. Ceramic can be used as the insulator, on which the coil 5, the capacitor 7 and the IC 3 are mounted so as to form a sensor system. Such system mounted on the ceramic insulator can be manufactured as a hybrid IC suitable for mass-production. However, the system shown in FIG. 11 can be manufactured more easily and the metal backed system stabilizes the resonating frequency.

Figure 12:
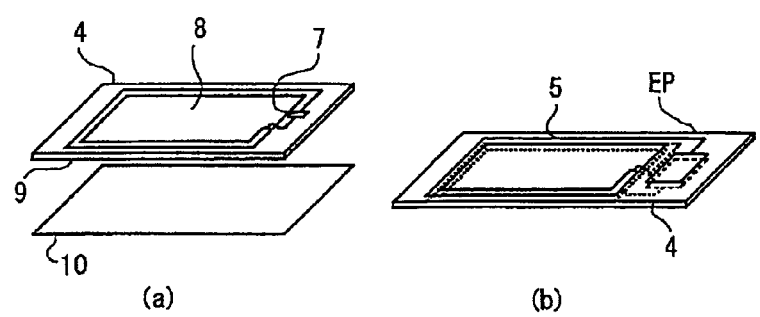
FIG. 12 is schematic perspective views illustrating resonator modules adherable to the sensors or the tags.

FIG. 12 depicts a schematic perspective views illustrating the resonator modules adherable to the sensor or the tag. The resonator 8 is arranged on the plastic sheet 4. Glue 9 is applied to a back surface of the plastic sheet 4 and silicone resin applied paper 10 is adhered to the glued back surface. The sensor or the tag is adhered to the glued back surface after peeling the paper 10 off. In this manner the resonator module can be mass-manufactured as in manufacturing coil-type tags by replacing IC chips used in the coil-type tag with capacitor chips.

FIG. 12 (a) shows the resonator 8 (constituted by the coil 5 and the capacitor 7) mounted on the adherable plastic sheet 4.

FIG. 12 (b) shows a resonator comprising two electrodes EP (as a capacitor) and coils 5 arranged on the front surface and rear surface of the plastic sheet 4. The two electrodes constitute a capacitor and the two coils connected via through hole, so that a resonator is formed. Without forming the thorough hole, two electrodes arranged on front surface works as a capacitor and two electrodes on rear surfaces can work in the same way.

Figure 13:
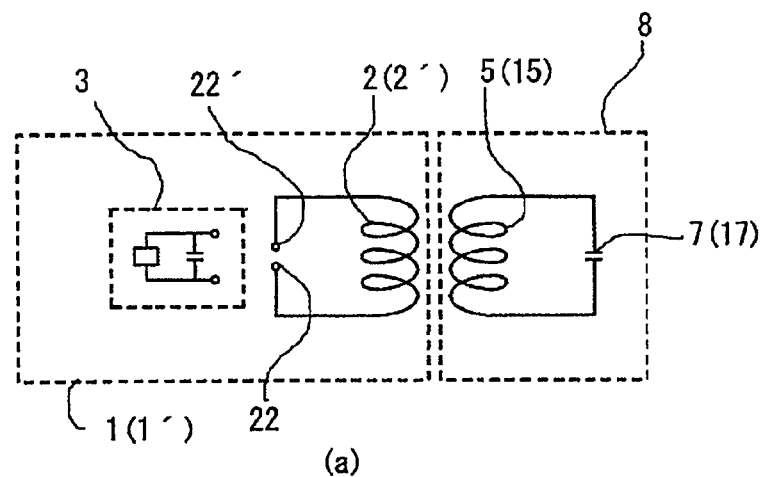
FIG. 13 is equivalent circuit diagrams of the resonators or the resonating circuits by the present invention.
Figure 13:
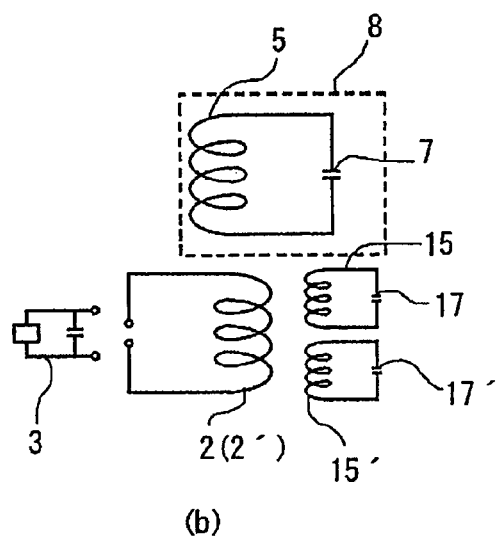

FIG. 13 depicts the equivalent circuit diagrams of the resonators or the resonating circuits by the present invention.

FIG. 13 (a) shows the resonating circuit mounted on the substrate 1 of the tag and the resonator 8 attached to the substrate 1. The resonator 8 is constituted by the coil 5 or the coil 15 and corresponding capacitor 7 or capacitor 17.

When the equivalent circuit is employed as a tag, the IC 3 is connected to the coil 2. When the equivalent circuit is employed as the sensor (indicated by reference characters in parentheses in FIG. 13 (a)), power is supplied to the terminals 22, 22' of the sensor coil 2'. A capacitor having an equivalent capacity to terminals of the IC 3 is depicted in FIG. 13 (a).

FIG. 13 (b) is an equivalent circuit diagram to the system shown in FIG. 10 (b) employed as the sensor. When the system used as the tag, the IC 3 is connected to both ends of the sensor coil 2'.

In the present equivalent circuit three resonating circuits are employed, but the number of the resonating circuits can be adjusted in accordance with how to utilize the system. The upper resonator 8 is a flat formed resonator. In the lower right-sided two resonators, the coils are wound around the magnetic substance. Depend on the objective of the system, these two resonators are used to enhance the magnetic field by inducing an electric current flowing in the coil, or to compensate magnetic field components excited in the center of the coil by an electric current flowing in the coil. Usually these resonators are used to excite magnetic field components.

Figure 14:
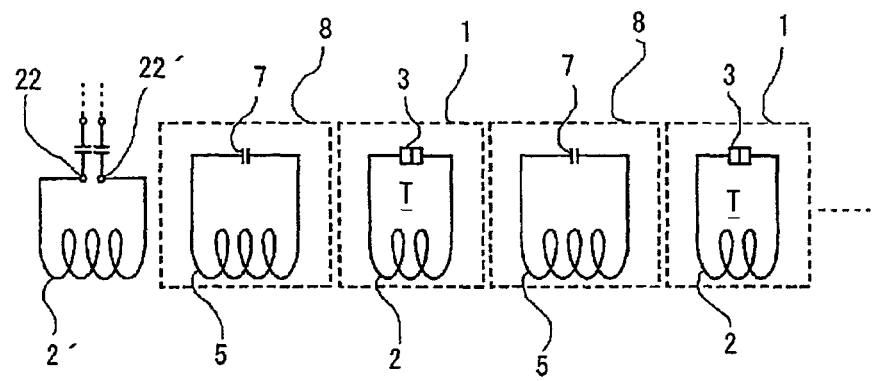
FIG. 14 is a circuit diagram of a system with plurality of tags.

FIG. 14 is the circuit diagram of the system with a plurality of tags. A plurality of the resonators 8 (constituted by the coils 5 and the capacitors 7) are properly arranged among the plurality of the tags (constituted by sensor coils 2 and the ICs 3). These resonators are used for enhancing intensity of the magnetic field. They are used to enhance magnetic field components generated by the left-sided sensing coil and to transmit further. Sometimes they are used to enhance magnetic field components around the sensors or the tags. Further, they are used to alleviate interferences among the tags or to compensate magnetic field components excited by the induction current. Or as a whole they are used to adjust the system so as to keep in a resonating state.

As shown in the drawing, the resonators and the tags can be arranged alternately or groups of the resonators and groups of the tags can be arranged alternately.

Particularly, the present system is very useful to a reader/writer which employs an anti-collision method for detecting signals by returning the system to the original position for a better sensing.

Figure 15:
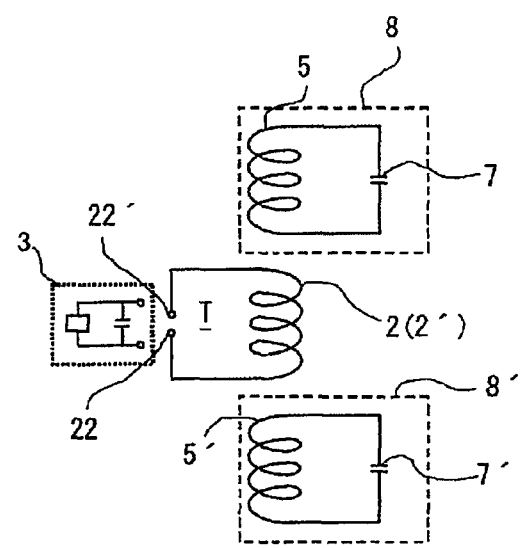
FIG. 15 is a circuit diagram of the sensor or the tag provided with two resonators in front and at the back of the sensor or the tag.

FIG. 15 is the equivalent circuit diagram of the sensor or the tag provided with two resonators 8, 8' depicted by broken-line squares in front and at the back of the sensor or the tag. The present circuit diagram is equivalent to, for example, the system shown in FIG. 4 (b), where the resonator constituted by the coil 5 and the capacitor 7 is arranged on the sensor coil 2' and another resonator constituted by the coil 5' and the capacitor 7' is arranged under the sensor coil 2'.

FIG. 4 (b) shows the sensor system, while FIG. 15 shows the IC tag system where the IC 3 is connected to the terminals 22, 22' of the sensor. A circuit in a broken-line square at the left side of FIG. 15 is an equivalent circuit of the IC 3.

Figure 16:
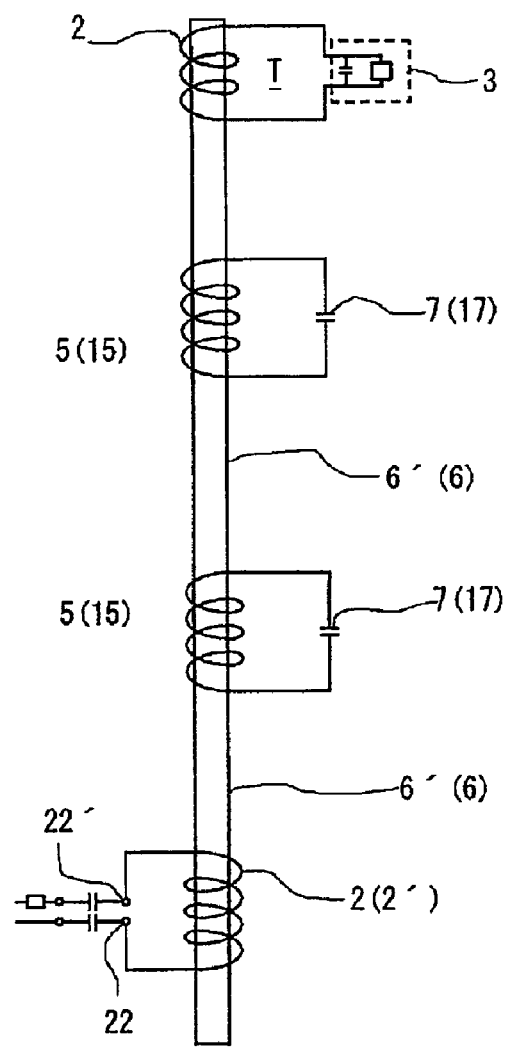
FIG. 16 is a circuit diagram of the sensor or tag arranged around a magnetic rod.

FIG. 16 is the circuit diagram of the sensor or the tag arranged around the square or round magnetic rod 6 or 6'. In the example shown in FIG. 6 (b), the sensor coil 2' is arranged on the magnetic substance in the center, power is supplied via the terminals 22, 22', and the coil 2 and the IC 3 above the magnetic substance are connected. Here the resonators constituted by the coils 5 and the capacitors 7 are arranged on both sides of and apart from the magnetic substance in the center so as to equalize magnetic field components above the magnetic substance. The metal plate can be arranged under the magnetic substance in order to constitute a metal backed sensor.

In FIG. 6 (b), the magnetic substance is a plate, but it can be the round rod or the square rod as shown in FIG. 16 as keeping the same effects. By arranging a plurality of the resonators, a distance between the sensor and the tag can be set farther. And the tag (constituted by the coil 2 and the IC 3) can be arranged apart from the magnetic substance instead of attaching to the magnetic substance. Enhanced magnetic field components or electric field by the resonators constituted by the coils 5 and the capacitors 7 or by the coils 15 and the capacitors 17 make communication between the sensor and the tag much easier.

Figure 17:
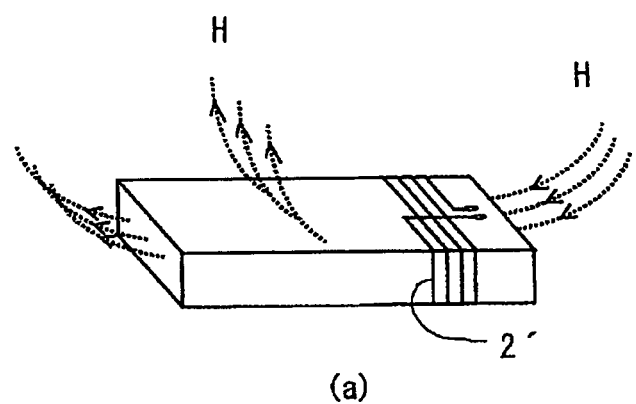
FIG. 17 is schematic perspective views explaining effects of the resonator arranged on the one-sided coiled metal backed magnetic substance.
Figure 17:
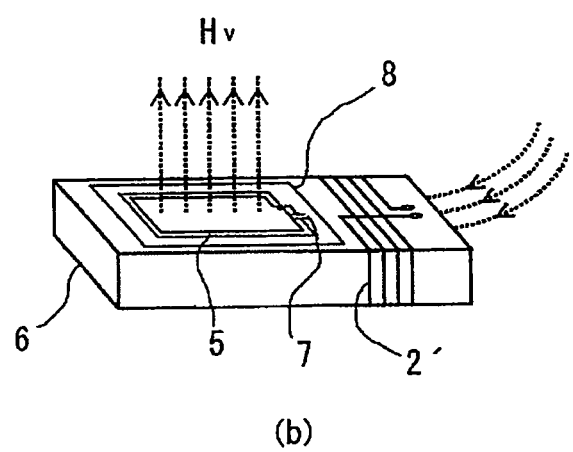

FIG. 17 depicts schematic perspective views explaining how magnetic field components are enhanced by the effects of the resonator arranged on the one-sided coiled metal backed magnetic substance.

In these drawings, approximate magnetic field component distributions are shown. As shown in FIG. 17 (a), vertical magnetic field components are generated in the central area of the magnetic substance 6 by the sensor coil 2' which is wound one-sidedly around the magnetic substance. However, some magnetic field components leak out from the other end of the magnetic substance 6, it is impossible to generate vertical magnetic field components only in the central area.

On the other hand, vertical magnetic field components are enhanced by the excited coil 5 of the resonator 8 as shown in FIG. 17 (b).

This enhancement of the vertical magnetic field components is the field formation effect as explained before.

Figure 18:
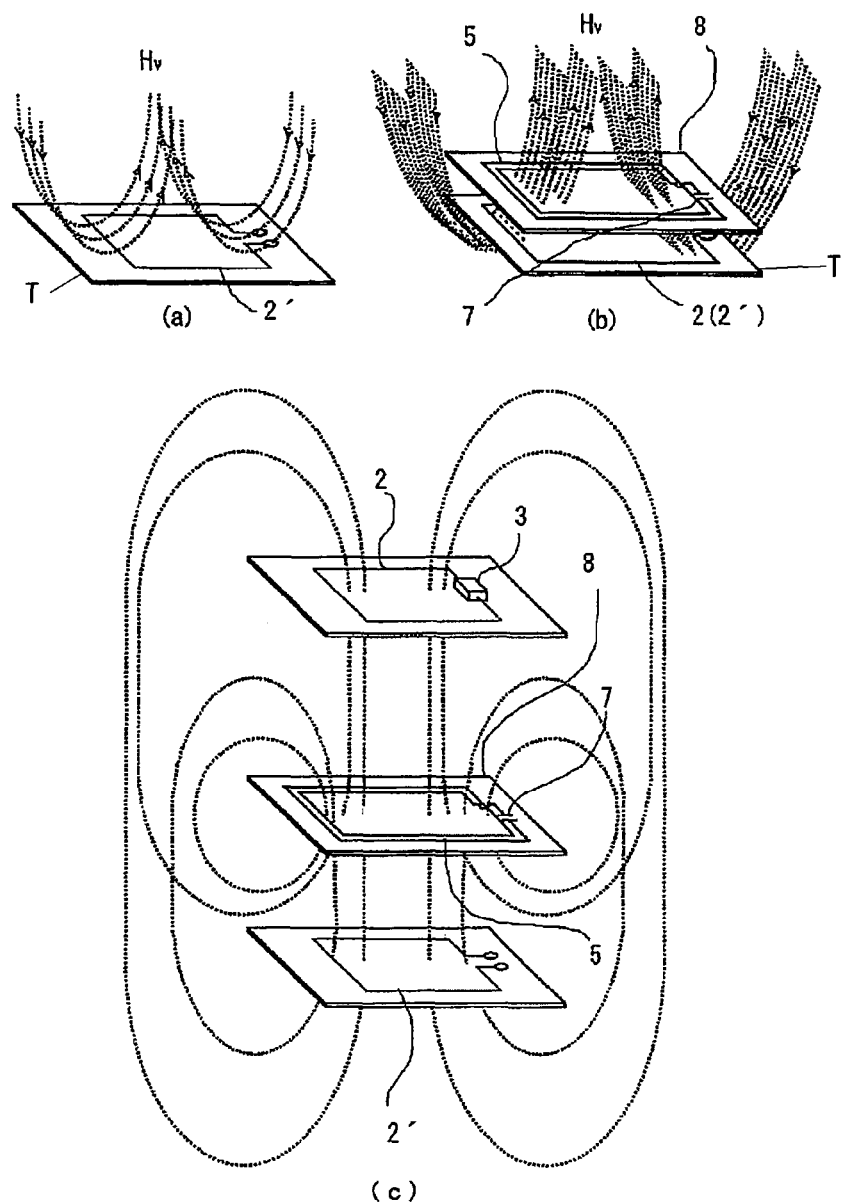
FIG. 18 is schematic perspective views explaining improved effects on the conventional sensor or the tag by the resonator.

FIG. 18 depicts schematic perspective views explaining improved effects on the conventional sensor or the tag by the resonator. Drawings show how magnetic field components generated by the sensor or the tag are improved by the resonator arranged in the same direction of the magnetic components.

FIG. 18 (a) shows magnetic field generated by the coil of an ordinary sensor or tag.

FIG. 18 (b) shows a lot of magnetic components are generated by an electric current flowing in the resonator 8 (constituted by the coil 5 and the capacitor 7), when the resonator 8 is approximated to the coil 2(2') of the sensor or the tag.

FIG. 18 (c) shows how the diverging magnetic field in accordance with a distance from the coil 2(2') of the sensor or the tag, is converged by the resonator 8 (constituted by coil 5 and the capacitor 7).

In the system shown in FIG. 18 (b), since the generated magnetic field by the resonator shows the same pattern as the magnetic field generated in the sensor coil or the coil of the tag, the higher the resonating current flowing in the resonator, namely the higher Q value is, the higher effects are attained. But the resonating current is determined taking applied band area, stability and winding number of the coil into consideration.

In the system shown in FIG. 18 (c), the magnetic field components can be concentrated in the center area and extending along center axis by inserting the resonator 8 at a proper position. Thus the resonator or the resonating circuit can be employed to enhance magnetic field components.

Figure 19:
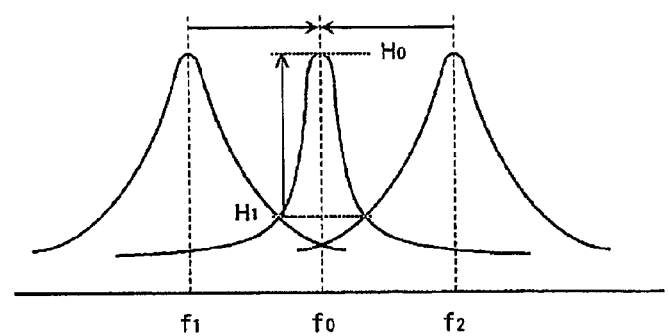
FIG. 19 is a schematic diagram explaining resonating characteristics of the resonator.

FIG. 19 is the schematic diagram explaining resonating characteristics of the resonator. When the resonator is added to the system, magnetic field intensity H of the sensor or tag is raised by ($H_0 \Box H_1$) around the resonating frequency $f_0$ as illustrated in FIG. 19.

The phenomenon as attained in the system shown in FIG. 17 to enhance vertical field magnetic components by the field formation is not attained only by a resonating characteristic. But the resonating characteristic is more sensitized and the vertical magnetic field components are increased.

Figure 20:
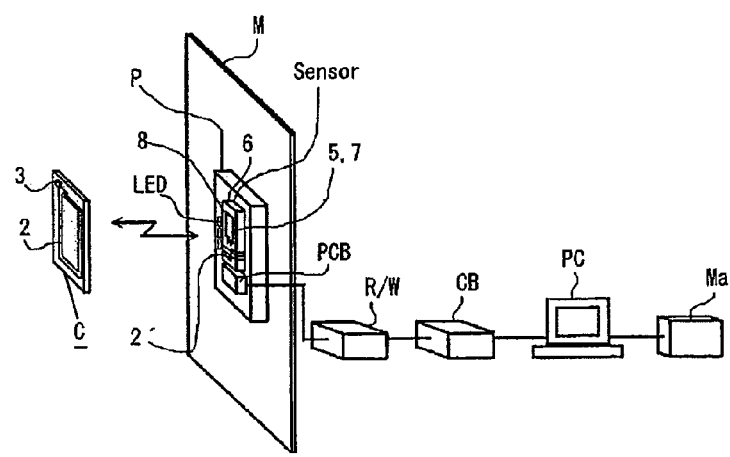
FIG. 20 is a schematic perspective view illustrating an improved metal backed sensor system to which the resonator by the present invention is attached.

FIG. 20 is the schematic perspective view illustrating the improved metal backed sensor system to which the resonator by the present invention is attached. The resonator is applied to the metal backed magnetic substance sensor so as to extend a communicable range to the non-contact type IC card. The resonator applied system can be employed in an access controlling system, a mechanic controlling system and in various administrative controls by utilizing communication status improving effects.

The resonator 8 is attached to the sensor. I/O terminals of the sensor coil 2' can be arranged in the back surface of the metal plate M via a printed circuit board PCB or the I/O terminals and a reader/writer W/R are connected to a control circuit CB via a switch box. In the drawing, a computer PC is employed for administrating various controls and memories. The computer attached to the sensor or the tag system can be utilized in various ways, such as for controlling mechanisms Ma with various functions as shown in the drawing. It is better to arrange an LED and a buzzer for recognizing system statuses more easily. The sensor is usually covered with a plastic cover P.

Figure 21:
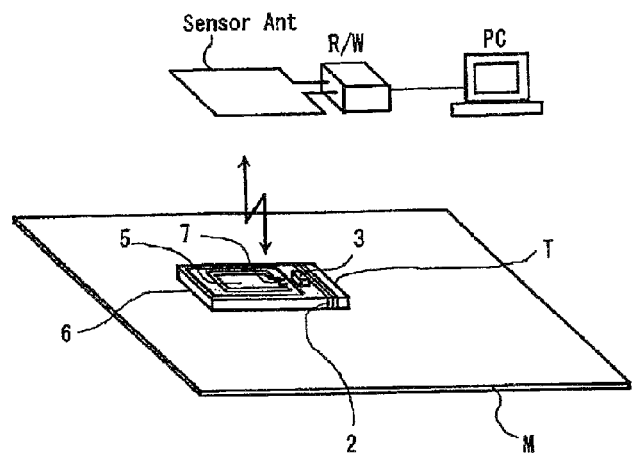
FIG. 21 is a schematic perspective view illustrating an improved metal backed tag system to which the resonator by the present invention is attached.

FIG. 21 is the schematic perspective view illustrating the improved metal backed tag system to which the resonator by the present invention is attached. On the upper surface of the magnetic substance 6 of the metal backed tag T, the resonator constituted by the coil 5 and the capacitor 7 is arranged for exciting vertical magnetic field components. Power is supplied to the IC 3 via the coil 2, and signals from the IC 3 are transmitted to a sensor (Sensor Ant) via the coil 2 and the coil 5 of the resonator.

The transmitted signals are read by the reader/writer R/W, which transmit read signals to the computer PC. The computer PC records the received signal and stores them in its memory. Sometimes the computer processes the received signals for further operations. The read signals by the reader/writer R/W can be transmitted in various means such as ZigBee, Bluetooth, a specific small radio station method or the like.

Figure 22:
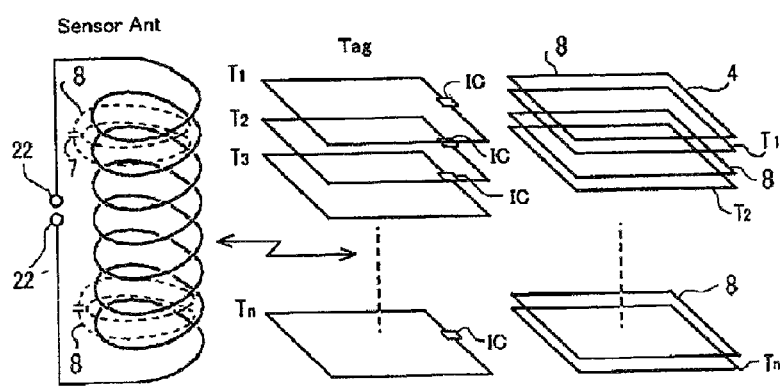
FIG. 22 is circuit diagrams of the improved sensor system and the improved tag system to which the resonator by the present invention is attached.

FIG. 22 is circuit diagram of the improved sensor system and the improved tag system to which the resonators by the present invention are attached.

The resonators or the resonating circuits shown in FIG. 22 are applied to a system in which a multi-tag system comprising tags $T_1, T_2 - - - T_n$ are required.

Such multi-tag system shown in FIG. 22 is used for identifying a lot of books or files placed on or out of shelves, or for selecting some of them. When a sensor antenna (Sensor Ant) is placed under or beside the tags, the resonators compensate deviations of resonating frequencies caused by interferences and inductions among the tags, so that the resonators make the system read signals from the tags properly. As shown in FIG. 22, when resonators 8 are arranged in respective tags or objects, communication statuses between the sensor and the tags are kept in good conditions such that communicable ranges between the sensor and tags are extended and resonating statuses in the tags are improved. When the resonators 8 are arranged in various places, good communication statuses are easily attained by moving the sensor antenna (Sensor Ant) freely. The sensor antenna (Sensor Ant) is directly connected to the reader/writer R/W via wires, but the reader/writer can be connected with the computer wirelessly via such as Bluetooth, ZigBee, NFC (Near Field Communication), the non-licensed small radio station method or the like.

Signals read by the reader/writer are administered and displayed by the computer.

What is claimed is:

1. A wireless communication field improving system using resonators to enhance performance of a radio frequency identification (RFID) system, the field improving system comprising: a sensor, and an IC tag or a non-contact type IC card; the sensor, or the IC tag or non-contact type IC card having a magnetic substance and a first coil wound spirally on a face of said magnetic substance; and a first resonator having a second coil and a first capacitor connected to said second coil, wherein: said second coil is wound spirally on the face of said magnetic substance and is arranged in the same axial direction as the axial direction of said first coil.

2. The field improving system provided with resonators according to claim 1, wherein: a cross-section of said magnetic substance perpendicular to the axis of said first coil shows a rectangular or circular shape.

3. The field improving system provided with resonators according to claim 1, further comprising: a reader/writer for reading transmitted signals between said sensor for RFID and said IC tag or said non-contact type IC card, and a computer for controlling mechanisms based on transmitted read signals by said reader/writer.

4. A wireless communication field improving system using resonators to enhance performance of a radio frequency identification (RFID) system, the field improving system comprising: a sensor, and an IC tag or a non-contact type IC card; the sensor, or the IC tag or non-contact type IC card having a magnetic substance and a first coil wound around said magnetic substance; and a first resonator having a second coil and a first capacitor connected to said second coil, wherein: said second coil is wound spirally on the face of said magnetic substance and is arranged in the same axial direction as the axial direction of said first coil.

5. A wireless communication field improving system using resonators to enhance performance of a radio frequency identification (RFID) system, the field improving system comprising: a sensor, and an IC tag or a non-contact type IC card; the sensor, or the IC tag or non-contact type IC card having a magnetic substance and a first coil wound around said magnetic substance; and a first resonator having a second coil and first capacitor connected to said second coil, wherein: said second coil is wound spirally on the face of said magnetic substance and is arranged such that the axis of said second coil is perpendicular to the axis of said first coil.

6. The field improving system provided with resonators according to claim 5, wherein: said first coil is wound around one end portion of said magnetic substance and said second coil is formed on a portion of the face of said magnetic substance where said first coil is not wound.

7. The field improving system provided with resonators according to claim 6, further comprising: a third resonator having a fourth coil wound around said magnetic substance and a third capacitor connected to said fourth coil, wherein: said fourth coil is arranged such that its axis is parallel to the axis of said first coil, and said fourth coil is wound around said magnetic substance such that its excited magnetic field is reversely directed to the magnetic field generated by said first coil.

8. The field improving system provided with resonators according to claim 7, wherein: said third resonator is arranged on the other end of said magnetic substance than the end where said first coil is wound around.

9. The field improving system provided with resonators according to claim 5, further comprising: a second resonator having a third coil and a second capacitor connected said third coil, wherein: said third coil is wound around said magnetic substance and is arranged such that the axis of said third coil is parallel to the axis of said first coil.

10. The field improving system provided with resonators according claim 9, wherein: said second resonator is arranged between said first coil and said first resonator.

* * * * *